US012578457B2

(12) United States Patent
Saarenketo et al.

(10) Patent No.: US 12,578,457 B2
(45) Date of Patent: Mar. 17, 2026

(54) METHOD FOR DETECTING CRACKS IN ROAD PAVEMENT

(71) Applicant: ROADSCANNERS HOLDING OY, Rovaniemi (FI)

(72) Inventors: Timo Saarenketo, Rovaniemi (FI); Pekka Maijala, Rovaniemi (FI); Rani Hamrouche, Rovaniemi (FI)

(73) Assignee: ROADSCANNERS HOLDING OY, Rovaniemi (FI)

( * ) Notice: Subject to any disclaimer, the term of this patent is extended or adjusted under 35 U.S.C. 154(b) by 502 days.

(21) Appl. No.: 18/020,394

(22) PCT Filed: Aug. 11, 2021

(86) PCT No.: PCT/FI2021/050548
§ 371 (c)(1),
(2) Date: Feb. 8, 2023

(87) PCT Pub. No.: WO2022/043605
PCT Pub. Date: Mar. 3, 2022

(65) Prior Publication Data
US 2023/0296754 A1    Sep. 21, 2023

(30) Foreign Application Priority Data

Aug. 25, 2020    (FI) ...................................... 20205824

(51) Int. Cl.
*G01S 13/88*        (2006.01)
*G01S 7/41*        (2006.01)
(52) U.S. Cl.
CPC ............. *G01S 13/885* (2013.01); *G01S 7/411* (2013.01)
(58) Field of Classification Search
CPC ........ G01S 13/885; G01S 13/89; G01S 7/411; G01V 3/12
See application file for complete search history.

(56) References Cited

U.S. PATENT DOCUMENTS

2017/0204569 A1*    7/2017    Shah ...................... H04N 23/56

FOREIGN PATENT DOCUMENTS

| CN | 108519596 A | 9/2018 |
| JP | 2019011641 A | 1/2018 |
| WO | 2014153263 A1 | 9/2014 |

OTHER PUBLICATIONS

International Search Report and Written Opinion in Application No. PCT/FI2021/050548, mailed Nov. 11, 2021, 11 pages.

(Continued)

*Primary Examiner* — Timothy A Brainard
(74) *Attorney, Agent, or Firm* — Meunier Carlin & Curfman LLC

(57) ABSTRACT

Method for detecting cracks in a road pavement by using a ground penetrating radar installed to a vehicle, the method comprises driving the vehicle along the road, scanning sections of the road, which scanned sections comprise at least one wheelpath area and at least one non-wheelpath area. The scanning includes transmitting electromagnetic pulses to the road, receiving reflected electromagnetic signals from the road, recording the received electromagnetic signals to a digital storage file and analysing the received electromagnetic signals. Analysing includes monitoring a selected high frequency range of the received signals over a selected monitoring interval, determining the spectral density of the received signals, calculating the differences of spectral densities of the wheelpath area and the non-wheelpath area and evaluating the presence of microcracks in wheelpath area based on the calculated differences in spectral densities. The monitored high frequency range is preferably of 3-4 GHz.

16 Claims, 2 Drawing Sheets

(56) References Cited

OTHER PUBLICATIONS

Search Report in Finnish Application No. 20205824 dated Mar. 3, 2021, 1 page.

Khavandi Khiavi, A.R., et al. "Considering a New Sample Unit Definition for Pavement Condition Index", Civil Engineering Infrastructures Journal, 52(1): 101-114, Jun. 2019.

Abu Dabous Saleh et al: "Condition monitoring of bridges with non-contact testing technologies", Automation in Construction. Elsevier, Amsterdam. NL, vol. 116. Apr. 15, 2020 (Apr. 15, 2020), XP086170003.

* cited by examiner

METHOD FOR DETECTING CRACKS IN ROAD PAVEMENT

CROSS REFERENCE

This application is a U.S. national stage application of international patent application number PCT/FI2021/050548 filed on Aug. 11, 2021 claiming priority to Finnish national application number 20205824 filed on Aug. 25, 2020.

TECHNICAL FIELD

A method for detecting cracks in a road pavement using a ground penetrating radar installed to a movable vehicle, which method comprises driving the vehicle along the road a selected survey distance, identifying at least one wheelpath area and at least one non-wheelpath area in the road pavement, scanning sections of the road, which scanned sections comprise at least one wheelpath area and at least one non-wheelpath area, which scanning includes transmitting electromagnetic pulses to the road with at least one transmitting antenna, receiving reflected electromagnetic signals from the road with at least one receiving antenna, recording the received electromagnetic signals to a digital storage file and analysing the received electromagnetic signals.

BACKGROUND ART

Asphalt or other bituminous bound pavement lifetime is described to be a function of stress and strain. At the end of lifetime period of the pavement two phases can be identified. First a microdamage phase, where the amount of non-visual microcracks, i.e. cracks having a width less than 0.2 mm, are growing in the pavement and at the same time permanent strain develops to the pavement which can be seen as increasing rut growth rate. Microdamage phase is followed by macrodamage phase, where visual cracks appear to the pavement and pavement loses especially its tensile strength, which leads to fast rutting and roughness as well as raveling and pothole problems. In most countries the pavement is normally repaired after visual pavement distress can be seen in the pavement surface or road roughness starts to increase. Standard repairing method is to lay a new asphalt or other bituminous bound overlay over the damaged pavement surface.

This late repairing policy leads to a situation that cracked pavement has already lost its strength, especially its tensile strength, when it is repaired. Therefore, all the shear stresses caused by heavy truck axles travelling on the new overlay are focused exactly on the points where the cracks in the damaged pavement beneath the new overlay are located. This leads to a fast failure of the new pavement. If the new pavement overlay were made during the microcrack initiation phase, the lifetime of the new pavement would be many times longer. However, the problem is that there has not been any reliable method to detecting asphalt pavement fatigue during the microcrack phase.

An object of the invention is to provide a method for detecting cracks in road pavement especially in the microcracking stage.

The object of the invention is achieved with a method, which is characterized in what is disclosed in the independent patent claim. Some preferred embodiments of the invention are disclosed in the dependent claims.

SUMMARY OF THE INVENTION

The method for detecting cracks in a road pavement using a ground penetrating radar installed to a movable vehicle comprises driving the vehicle along the road a selected survey distance, identifying at least one wheelpath area and at least one non-wheelpath area in the road pavement, scanning sections of the road, which scanned sections comprise at least one wheelpath area and at least one non-wheelpath area, which scanning includes transmitting electromagnetic pulses to the road with at least one transmitting antenna, receiving reflected electromagnetic signals from the road with at least one receiving antenna, recording the received electromagnetic signals to a digital storage file and analysing the received electromagnetic signals.

Analysing the received electromagnetic signals includes monitoring a selected high frequency range of the received electromagnetic signals over a selected monitoring interval, determining the spectral density of the received electromagnetic signals over the selected high frequency range, calculating the differences of the determined spectral densities of the wheelpath area and the non-wheelpath area and evaluating the presence of microcracks in the road pavement wheelpath area based on the calculated differences in the determined spectral densities.

In the method spectral density is calculated to characterize the frequency content over a selected high frequency range. The spectral density characterizes the frequency content of the signal and describes how power of a signal is distributed over frequency range. Thus, the method helps the user to spot any increase in the selected high frequency range resulting from Rayleigh scattering due to microcracks.

In a first preferred embodiment of the method the monitored high frequency range is 2.5-4.5 GHz, preferably of 3-4 GHz.

In a second preferred embodiment of the method the monitoring interval of the selected high frequency range of the received electromagnetic signals is from pavement surface level up to 6 ns, preferably substantially 4 ns. The monitoring interval is selected based on the thickness of the pavement to be surveyed.

A yet another preferred embodiment of the method comprises extracting a 2 ns long or less diminished monitoring interval from the selected monitoring interval and sliding the diminished monitoring interval at the step of 0.25 ns over the selected monitoring interval, calculating frequency densities of the received electromagnetic signals of the selected frequency range over the diminished monitoring interval at each step and determining the power of the selected frequency range by normalizing the calculated frequency densities over the monitored frequency range.

A yet another preferred embodiment of the method comprises creating a map of the scanned road area, identifying the microcracked areas of scanned road area and displaying information of the microcracked areas on the map. The information of the microcracked area may include areal coverage of the microcracks, depth of the microcracking and/or information on abnormal increase in the intensity of the monitored frequencies indicating fast increase of microcracks. Tracking the evolution of the microcracking requires several repeated surveys. Depth of the microcracking is estimated as a function of signal travel time.

In yet another preferred embodiment of the method the wavelength of the transmitted electromagnetic pulses is 1 to 10 cm in asphalt pavement and the central frequency of the transmitted electromagnetic pulses is 1.5-3.0 GHz, preferably substantially 2.5 GHz.

In yet another preferred embodiment of the method the ground penetrating radar is a ground coupled pulse radar system. Alternatively, the ground penetrating radar may be a stepped frequency radar system.

In yet another preferred embodiment of the method the cross section of the road is scanned using single antenna in contact with the pavement surface.

In yet another preferred embodiment of the method the section of the road is scanned using 2 to 4 antennas in contact with the pavement surface, which are moving zig-zag over the pavement in a transverse direction in relation to the moving direction of the vehicle.

In yet another preferred embodiment of the method the section of the road is scanned using a multichannel 3D GPR system with antenna spacing less than 0.2 m.

In yet another preferred embodiment of the method at least ten scans are done within the moving distance of one meter of the vehicle. Preferably, each scan is done with a resolution of 1024 samples or more in a time window of 10 ns.

An advantage of the invention is, that it provides a reliable method for detecting cracks in the pavement already in the microcracking phase, where the cracks are not yet visible. This makes possible to optimise the timing of the repair work of the pavement, which extends the lifespan of the new pavement layer.

A further advantage of the invention is, that it provides information of the cracking depth of the pavement. This information is important, when the need of milling or routing of the surface of the damaged pavement is evaluated.

BRIEF DESCRIPTION OF THE DRAWINGS

In the following the invention will be described in detail, by way of examples, with reference to the accompanying drawings in which.

DETAILED DESCRIPTION

Figure 1:
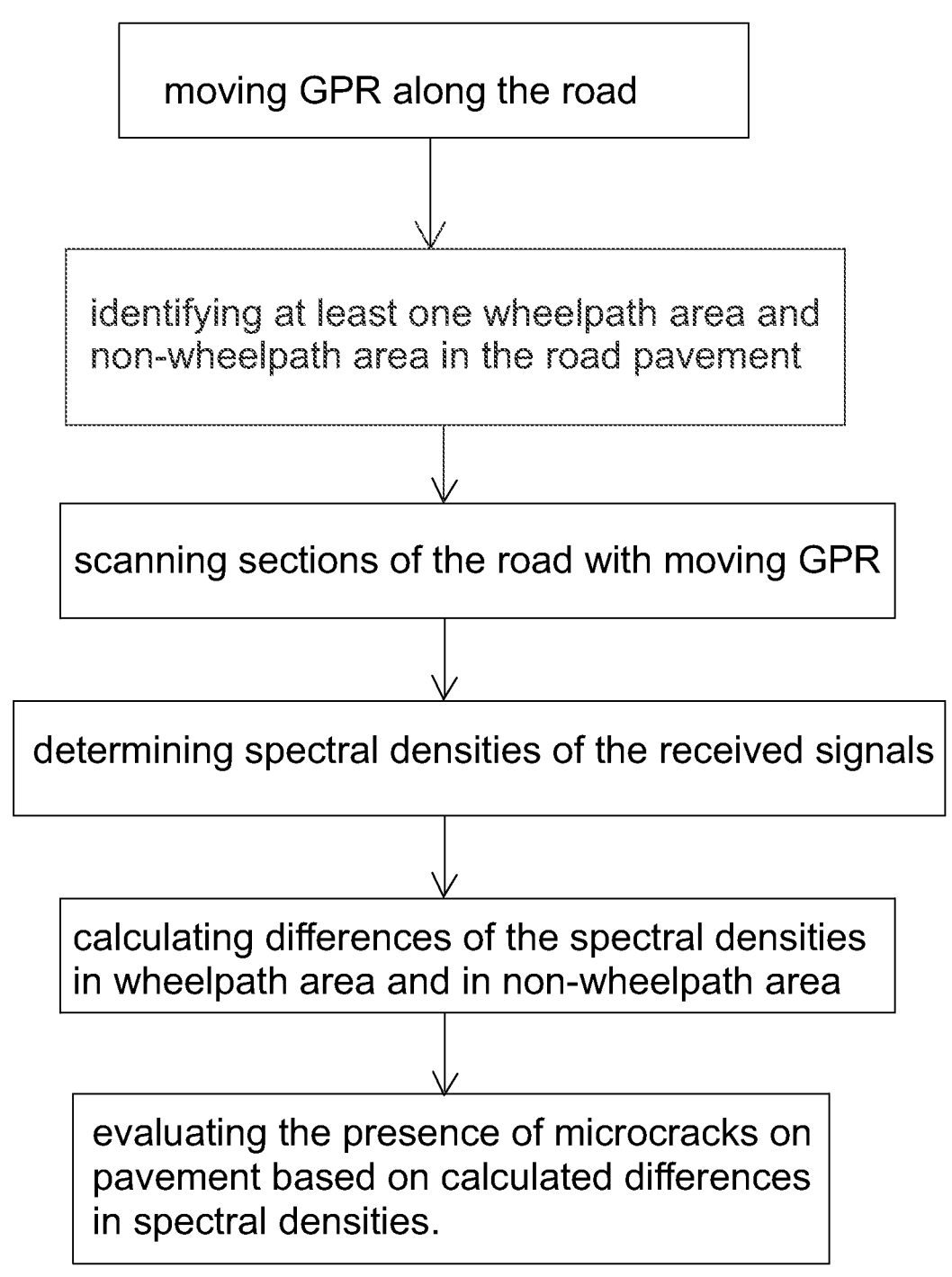
FIG. 1 depicts a flow chat of an embodiment of the method according to the invention and FIG. 2 depicts an example of a GPR-system used in the method.

In FIG. 1 an embodiment of the method for detecting cracks in a road pavement according to the invention is depicted as a simplified flow chart. In the method a ground penetrating radar installed to a movable vehicle is used. When implementing the method, the vehicle is driven along the road for a selected survey distance. While the vehicle, and the ground penetrating radar (GPR) installed therein, is moving on the road, sections of the road are scanned with the ground penetrating radar. In the method at least ten scans are done within the moving distance of one meter of the vehicle and each scan is done with a resolution of 1024 samples or more in a time window of 10 ns.

Since the most cracked areas of the road pavement are the wheelpath areas, which carry the heavy loads of the vehicles moving on the road, the scanned area must comprise at least one wheelpath area. To have a lightly loaded reference area, the scanned section must comprise at least one non-wheelpath area. Wheelpath area is the area of the road pavement along which the wheels of the vehicles roll, when the vehicle travels along said road. Those areas of the road pavement not belonging to the wheelpath areas are non-wheelpaths areas. The definition of the wheelpath area and non-wheelpath area is self-evident for a skilled person based of the names of these areas alone. In tarmac and asphalt pavements the wheelpath area is typically lighter-coloured (because of wearing) than the non-wheelpath area. Also, the wheelpath area has most often grooves and ruts caused by the vehicle tyre induced abrasion and deformations caused by heavy axle loads of trucks. Duo to the lighter colouring and ruts the wheelpath areas and non-wheelpath areas are easy to detect and identify by simple visual inspection. The wheelpath area and non-wheelpath areas are well-known and widely used terms in the road manufacturing literature, for example in publication "Standard practice for quantifying cracks in asphalt pavement surfaces", American Association of State Highway and Transportation Officials. AASHTO Reports. (2001)

Preferably the scanned section comprises at least one lane of the road including safety band on the edge of the lane, two parallel wheelpaths and a strip between the wheelpaths. Scanned section may also include two or more parallel lanes of the road.

The GPR-system used in the method may be a ground coupled pulse radar system or stepped frequency radar system with pulse radar central frequency being 1.5-3.0 GHz. Scanning can be made either by measuring a single cross section of the road with a single antenna or by using 2-4 GPR antennas that that are moving zig-zag in transverse section when a survey vehicle is moving on the road. It is also possible to use a multichannel 3D GPR system with antenna spacing less than 0.2 m. In 3D GPR-system antennas can be located on wheel path area only. While driving on the road the transmitting antenna(s) of the GPR-system transmit electromagnetic pulses to the road and receiving antenna(s) receive reflected electromagnetic signals from the road. Depending on the used GPR-system the transmitting antenna and receiving antenna may be different antennas or transmitting and receiving may be done with the same antenna. The received electromagnetic signals are analysed and recorded to a digital storage file. Operation principle of the GPR-system is common general knowledge which is not described here more closely.

In the method according to the invention analysing the received electromagnetic signals includes monitoring a selected high frequency range of the received electromagnetic signals over a selected monitoring interval. In conventional road surveys, where GPR-system is used, usually only central frequencies of the reflected signals are monitored. In the invented method however, the monitored frequency range is not the central frequencies range but specifically the high frequency range, i.e. frequency range of 2.5-4.5 GHz or preferably of 3-4 GHz. The selected monitoring range of the reflected signals is based to an observation, that when the transmitted pulse encounter cracks in the pavement, waves of the pulse scatter, following the principles of Rayleigh scattering. If the encountered cracks are microcracks, i.e. cracks having a width less than 0.2 mm, the shorter wavelengths (higher frequencies) are scattered more strongly. This is also combined with the effect of fluctuations, where the dielectric value (or density) of the micro-cracked area differs from the average dielectric value (or density) of the non-cracked pavement and leads to scattering. For the Rayleigh scattering to be valid, the cracks need to be ten times smaller than the transmitted wavelength. Therefore, wavelength of the transmitted electromagnetic pulse should be 1 to 10 cm in asphalt pavement.

In the invention the spectral density of the received electromagnetic signals over the frequency range is determined and the differences of the determined spectral densities of the wheelpath area and the non-wheelpath area are calculated. Finally, the presence of microcracks in the road pavement wheelpath area is evaluated based on the calculated differences in the determined spectral densities. The evaluation is based on an assumption that the amount of microcracks in the lightly loaded areas of the road pavement is very low or insignificant, whereby the cracks have no or little effect on the monitored reflected signals. Instead, the heavily loaded wheelpath area may contain microcracks, which shows in the monitored reflected signals. Thus, the differences in the determined spectral densities between the wheelpath area and the non-wheelpath area are an indication of the presence of microcracks.

The thickness of the asphalt or bituminous bound pavement is usually less than 25 cm. Since the aim of the invention is to determine the existence and amount of microcracks in the pavement only, the signals reflecting back from deeper than the pavement thickness are overlooked. This overlooking is done by selecting suitable time window, i.e. a monitoring interval, during which the selected high frequency range is monitored. By using a monitoring interval of up to 6 ns from pavement surface, the whole thickness of a normal asphalt or bituminous bound pavement is covered.

From the selected monitoring interval a 2 ns long or less diminished monitoring interval is extracted and the diminished monitoring interval is slided at the step of 0.25 ns over the selected monitoring interval. Frequency densities of the received electromagnetic signals of the selected frequency range are calculated over the diminished monitoring interval at each step and the power of the selected frequency range is determined by normalizing the calculated frequency densities over the monitored frequency range. The frequency densities are normalized by the frequency window width, which gives the power at the given frequency range.

In the method a map of the scanned road area is created, in which map the microcracked areas of the scanned road area are identified and information relating to the microcracked areas is displayed. This information may include cross-section figures on the road pavement showing the location of the microcracks in the transverse direction of the road or lane and the depth of the microcracks measured from surface of the pavement. The information may also include data showing abnormal increase in the intensity of the monitored frequencies indicating fast increase of microcracks and warning about high risk of macrocrack development in a short time.

Once the amount of microcracks is determined at different areas and depths in the pavement in the road section to be surveyed these results can be confirmed with other indirect Non-Destructive Testing (NDT) methods likes thermal cameras, deflection survey data analysis or calculating annual rut increase values.

Figure 2:
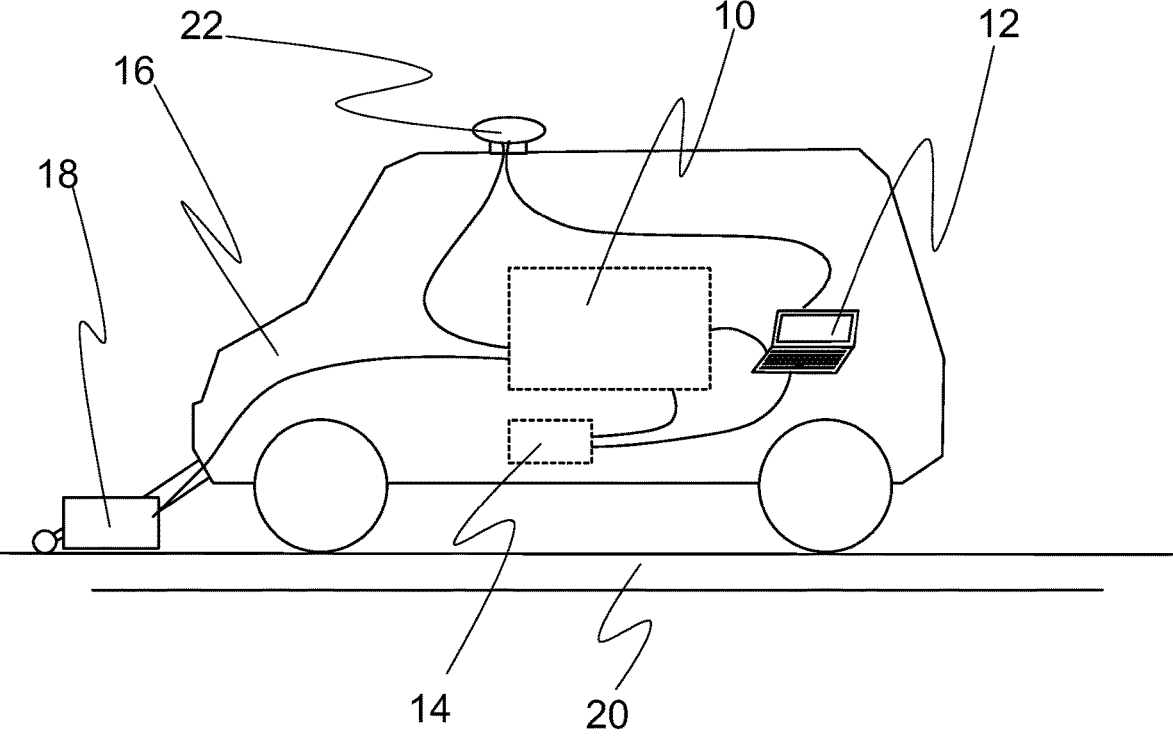

In FIG. 2 an example of a GPR-system used in the method is shown as side elevation. The system includes a ground penetrating radar device 10 including a measurement unit and recording unit. The GPR-unit is controlled with an operating unit 12, which may be a laptop computer. The GPR-device and operating unit are connected to a power source 14. The GPR-system is installed to a vehicle 16 moving along the road. In front of the vehicle there is a ground coupled antenna 18, which is supported by rolls to the pavement 20 of the road. On the roof of the vehicle, there is a GPS-positioning device 22. The ground coupled antenna 18 and the GPS-positioning device 22 are connected to the GPR-device 10 with cables.

Some preferred embodiments of the method according to the invention has been disclosed above. The invention is not limited to the solutions explained above, but the invention can be applied in different ways within the limits set by the patent claims.

The invention claimed is:

1. A method for detecting cracks in a road pavement by using a ground penetrating radar installed to a movable vehicle, which method comprises:
   driving the vehicle along a road a selected survey distance,
   identifying at least one wheelpath area and at least one non-wheelpath area in the road pavement,
   scanning sections of the road, which scanned sections comprise at least one wheelpath area and at least one non-wheelpath area, which scanning includes
      transmitting electromagnetic pulses to the road with at least one transmitting antenna,
      receiving reflected electromagnetic signals from the road with at least one receiving antenna,
      recording the received electromagnetic signals to a digital storage file and
      analysing the received electromagnetic signals,
   wherein
   analysing the received electromagnetic signals includes
      monitoring a selected high frequency range of the received electromagnetic signals over a selected monitoring interval,
      determining the spectral density of the received electromagnetic signals over the selected high frequency range,
      calculating the differences of the determined spectral densities of the wheelpath area and the non-wheelpath area, and
      evaluating a presence of microcracks in the road pavement wheelpath area based on the calculated differences in the determined spectral densities.

2. The method according to claim 1, wherein the monitored high frequency range is 2.5-4.5 GHz.

3. The method according to claim 1, wherein the monitoring interval of the selected high frequency range of the received electromagnetic signals is from pavement surface level up to 6 ns.

4. The method according to claim 1, wherein the method further comprises:
   extracting a 2 ns long or less diminished monitoring interval from the selected monitoring interval and sliding the diminished monitoring interval at the step of 0.25 ns over the selected monitoring interval,
   calculating frequency densities of the received electromagnetic signals of the selected frequency range over the diminished monitoring interval at each step, and
   determining the power of the selected frequency range by normalizing the calculated frequency densities over the monitored frequency range.

5. The method according to claim 1, wherein the method further comprises:
   creating a map of the scanned road area,
   identifying the microcracked areas of scanned road area, and
   displaying information of the microcracked areas on the map.

6. The method according to claim 1, wherein the wavelength of the transmitted electromagnetic pulses is 1 to 10 cm in asphalt pavement and the central frequency of the transmitted electromagnetic pulses is 1.5-3.0 GHz.

7. The method according to claim 1, wherein the ground penetrating radar is a ground coupled pulse radar system.

8. The method according to claim 1, wherein the ground penetrating radar is a stepped frequency radar system.

9. The method according to claim 1, wherein the cross section of the road is scanned using single antenna in contact with the pavement surface.

10. The method according to claim 1, wherein the section of the road is scanned using 2 to 4 antennas in contact with the pavement surface, which are moving zig-zag over the pavement in a transverse direction in relation to the moving direction of the vehicle.

11. The method according to claim 1, wherein the section of the road is scanned using a multichannel 3D GPR system with antenna spacing less than 0.2 m.

12. The method according to claim 1, wherein at least ten scans are done within the moving distance of one meter of the vehicle.

13. The method according to claim 1, wherein each scan is done with a resolution of 1024 samples or more in a time window of 10 ns.

14. The method according to claim 1, wherein the monitored high frequency range is 3-4 GHz.

15. The method according to claim 1, wherein the monitoring interval of the selected high frequency range of the received electromagnetic signals is from pavement surface level up to 4 ns.

16. The method according to claim 1, wherein the wavelength of the transmitted electromagnetic pulses is 1 to 10 cm in asphalt pavement and the central frequency of the transmitted electromagnetic pulses is 2.5 GHz.

* * * * *